(12) United States Patent
Nordstrom (10) Patent No.: US 10,850,901 B2
(45) Date of Patent: Dec. 1, 2020

(54) HIGH-STRENGTH FLUTING FROM NSSC PULP

(71) Applicant: Billerudkorsnas AB, Solna (SE)

(72) Inventor: Fredrik Nordstrom, Karlstad (SE)

(73) Assignee: BILLERUDKORSNAS AB, Solna (SE)

( * ) Notice: Subject to any disclaimer, the term of this patent is extended or adjusted under 35 U.S.C. 154(b) by 52 days.

(21) Appl. No.: 15/531,263

(22) PCT Filed: Nov. 20, 2015

(86) PCT No.: PCT/EP2015/077190
§ 371 (c)(1),
(2) Date: May 26, 2017

(87) PCT Pub. No.: WO2016/083252
PCT Pub. Date: Jun. 2, 2016

(65) Prior Publication Data
US 2017/0327285 A1    Nov. 16, 2017

(30) Foreign Application Priority Data

Nov. 26, 2014 (EP) .................... 14194891

(51) Int. Cl.
*B65D 65/40* (2006.01)
*B65D 81/38* (2006.01)
(Continued)

(52) U.S. Cl.
CPC ......... *B65D 65/403* (2013.01); *B65D 81/386* (2013.01); *B65D 85/34* (2013.01);
(Continued)

(58) Field of Classification Search
CPC .... B65D 65/403; B65D 81/386; B65D 85/34; D21F 11/12; D21F 3/0209; D21F 3/0218; D21H 11/02; D21H 27/10; D21H 27/40
See application file for complete search history.

(56) References Cited

U.S. PATENT DOCUMENTS 6,322,667 B1   11/2001  McCall et al.
6,730,192 B1    5/2004  Laapotti
(Continued)

FOREIGN PATENT DOCUMENTS

CN    101418532 A    4/2009
DE     29923284 U1   8/2000
(Continued)

OTHER PUBLICATIONS

Ceragioli et al. "Paper Drying Under Z-Direction Restraint to Improve the Strength Properties of Short-Fiber High-Yield Pulps" pp. 138-148 excerpted from Pulp, Paper and Board Elsevier Applied Science 1987 (Year: 1987).*
(Continued)

*Primary Examiner* — Frank J Vineis
*Assistant Examiner* — Laura B Figg
(74) *Attorney, Agent, or Firm* — Stites & Harbison PLLC; Richard S. Myers, Jr.

(57) ABSTRACT

There is provided a method of producing a containerboard, comprising the step of pressing a web formed from a pulp comprising NSSC pulp in an extended nip press, such as a shoe press, wherein the line load in the extended nip press is above 1200 kN/m. Further, there is provided a corrugated board comprising a liner and a fluting, wherein the fluting is formed from a pulp comprising NSSC pulp, the density of the fluting is above 725 kg/m$^3$ and the geometric SCT index (ISO 9895) of the fluting is above 37 Nm/g.

8 Claims, 6 Drawing Sheets

(51) Int. Cl.
| | |
|---|---|
| D21H 27/10 | (2006.01) |
| D21H 27/40 | (2006.01) |
| D21F 3/02 | (2006.01) |
| D21F 11/12 | (2006.01) |
| D21H 11/02 | (2006.01) |
| B65D 85/34 | (2006.01) |

(52) U.S. Cl.
CPC .......... *D21F 3/0209* (2013.01); *D21F 3/0218* (2013.01); *D21F 11/12* (2013.01); *D21H 11/02* (2013.01); *D21H 27/10* (2013.01); *D21H 27/40* (2013.01)

(56) References Cited

U.S. PATENT DOCUMENTS

| | | | |
|---|---|---|---|
| 8,142,615 | B2 | 3/2012 | Wildlock et al. |
| 2002/0125308 | A1* | 9/2002 | McLeod .............. B65D 5/0025 229/174 |

FOREIGN PATENT DOCUMENTS

| | | |
|---|---|---|
| EP | 0219643 B1 | 1/1991 |
| EP | 2022891 A2 | 11/2009 |
| JP | 20080031585 A | 2/2008 |
| WO | WO95/09946 A1 | 4/1995 |
| WO | WO9509946 A1 | 4/1995 |
| WO | WO2004038095 A1 | 5/2004 |
| WO | WO2013050436 A1 | 11/2013 |

OTHER PUBLICATIONS

ISO 9895:2008(E) "Paper and board—Compressive Strength—Short-span test" (Year: 2008).*
SCAN-P 42:81 "CCT value and CCT index" (Year: 1981).*
Guadalix et al. Comparative Analysis of Wheat Straw Paperboards Preparted After Biomechanical and Semichemical Pulping. 1996, Elsevier, Biorescource Technology issue 57, pp. 271-227 (Year: 1996).*
Orloff, et al., "Linerboard drying on a sheet-fed pilot impulse drying shoe press", Tappi Journal, vol. 78, No. 1, Jan. 1995, pp. 129-141.
Paper and Board Grades; ISBN 952-5216-18-8 (book 18); pp. 64-72.
Shuohui, et al., A Comparison of the Effects of Papermaking Variables on 'Ring Crush Strength and Short-Span Compressive Strength of Paperboard 3; PAPTAC 91st Annual Meeting—2005—91ieme Congres Annuel ATPPC; B153-13166.
ISO 9895:2008(E); Oct. 15, 2008.
ISO 4046-12002(E/F); Oct. 1, 2002.
WOTOL/Carcano: Semi chemical fluting liner paper; Jan. 24, 2011.
Lange, et al., Experiences with various shoe press applications; Pulp & Paper Canada; Sep. 2006; 107,9; pp. 22-24.
Back, Ernst; Using the wet press to optimise paper properties; STFI, The Swedish Pulp and Paper Research Institute; Apr. 1987; pp. 454-459.
Zotterman, Carl; New Shoe Press Design Now Operations on World's Largest Linerboard Machine; 1993 Papermakers Conference; pp. 311-318.
Richardson, et al.,; Note on the compression strengthh of fluting over a temperature and moisture range; 39 Jahrgang Heft 7 1985; pp. 302-305.
Panchapakesan, Bala; Press, dryer section operation affected by recycled fiber us; Pulp & Paper; Apr. 1996; 70, 4; pp. 115-118.
Spachman, John; Not just hot air; PaperAge; May/Jun. 2007; pp. 30-32.
Whitsitt, W. J.; Compressive strength relationships and factors; IPC Technical Paper Series; No. 163; Oct. 1985; pp. 1-4.
Hendry, I.F.; Paper drying under z-direction restraint to improve the strength properties of short-fiber high-yield pulps; Pulp, Paper and Board, 1987.
Flyer PMP: Intelli-Nipshoe Press.
Lange, Dave; Shoe pressing of paper grades; 1996 Papennakers Conference; pp. 437-440.
Papnews: News from the paper industry; May 12, 2014.
WOTOL/Carcano: Semi chemical fluting liner paper; Apr. 17, 2012.
Back, et al., Multistage press drying of paper; svensk papperstidnigh nr 2 1979; pp. 35-39.
Fourdrinier Kraft Board Group of the American Paper Institute Mar. 15, 1982.
Back, et al., The properties of NSCC-based and waste based corrugating; Paper Technology; Oct. 1989; pp. 16-23.
Pikulik, Ivan; The effects of shoe pressing on the properties of wood-containing papers; 2000 TAPPI Journal Peer Reviewed Paper; Feb. 5, 2000.
Niskanen: Science and Technology; Structural mechanics of paper and board; pp. 210-213.
Zotterman, Carl; the new shoe press in operation at Obbola, Grovon, Pori and Kemsley mills; Paper Technology; May 1994; Shoe Press pp. 18-23.
Back, Ernst L., Press drying compared to other means of densifying paper; Press Drying; Tappi Journal; Mar. 1985; vol. 68, No. 3.; pp. 92-96.
Glossary of papermaking terms.
Anon: Neue Pressenpartie erhoht die Kapazitat; Oct. 2014.
Notice of Opposition—International Paper Company.
Notice of Opposition—Smurfit Kappa Ireland Limited.
Dix, et al., Halbzellstoffe nach dem NSSC-Verfahren aus Pappelholz; Holz als Rob- und Werkstoff 47 ( 1989); pp. 437-445.
Lavrov, et al.
Lang, David V.; Shoe presses and their application to recycled fibers; 1991 Engineering Conference; pp. 51-54.
Justus, et al., Extended Nip-Press; 36 Jahrgang Heft 10 A 1982; pp. V152-V158.
Rogut: Nowoczeesne prasy a jakosc papieru plus translation.
Notice of Opposition—Mondi AG.
Notice of Opposition—Stora Enso OYJ.
English translation of Chinese Office Action in corresponding foreign application.
European Search Report dated Apr. 2, 2015.
Gavelin G, Kraft Paper and Kraft Liner, Professional Instructions; 2001.
Frank B, Revisiting paper strength measurements for estimating combined board strength, Tappi Journal, vol. 5., No. 9, Sep. 2007pp. 10-17.

* cited by examiner

HIGH-STRENGTH FLUTING FROM NSSC PULP

CROSS REFERENCE TO RELATED APPLICATIONS

This application is a § 371 National State Application of PCT/EP2015/077190 filed Nov. 20, 2015 which claims priority to EP 14194891.9 filed Nov. 26, 2014.

TECHNICAL FIELD

The invention relates to a method of producing a containerboard to be used as fluting.

BACKGROUND

Neutral Sulfite Semi-Chemical (NSSC) pulping is an old process that it is well known in the field of paper pulping and in use in many pulp mills around the world. One of the reasons for using NSSC pulping is the high yield.

In NSSC pulping, the cooking liquor comprises sulfite, such as $Na_2SO_3$ or $(NH_4)_2SO_3$ and a base, such as NaOH or $Na_2CO_3$. "Neutral" means that the pH of the NSSC cooking liquor is generally between 6 and 10. Normally, the cooking time is between 0.5 and 3 hours and the cooking temperature is 160-185° C. The NSSC pulp comprises comparatively high amounts of residual lignin, such as 15-20%, which make the NSSC pulp stiff. The NSSC pulping is "semi-chemical" in the sense that it comprises mechanical treatment/grinding.

The NSSC pulp is for example used to produce containerboard that is subsequently corrugated to form the fluting of corrugated board.

Examples of mills using the NSSC pulping method are: Mondi Swiecie S. A.'s mill in Swiecie (PM4), Poland; Savon Sellu Oy's (Powerflute's) mill in Koupio, Finland; Stora Enso Oyj's mill in Heinola, Finland (Heinola Fluting Mill); Packaging Corp. of America's mills in Filer City and Tomahawk, United States; Him Group's mill (PM1 and PM3) in Korjazma, Russia (Kotlas Mill); JSC Arkhangelsk Pulp & Paper's mill (PM2) in Novodvinsk, Russia; Rock-Tenn Co.'s mill in Stevenson, United States; International Paper's mills in Mansfield, Pine Hill and Valiant, United States; Georgia Pacific LLC's mills in Big Island, Cedar Springs and Toledo, United States and Norampac Inc's mills in Cabano and Trenton, Canada.

SUMMARY

One way of increasing the strength of corrugated board is to increase the compressive strength of the containerboard used to form the fluting (i.e. the corrugated medium) of the corrugated board.

In is an object of one aspect of the present disclosure to provide a method of producing a containerboard of increased strength from pulp comprising NSSC pulp.

In is an object of another aspect of the present disclosure to provide a corrugated board having a corrugated medium of increased strength, wherein pulp comprising NSSC pulp is used to form the containerboard of the corrugated medium.

It is often desirable to reduce the density (i.e. increase the bulk) of paperboard as lower density is associated with lower consumption of fibers/raw material. The present inventor has however realized that one way of increasing the compressive strength of the containerboard is to increase its density. Further, the inventor has realized that the density may be increased by wet pressing. It is however difficult to press a web from NSSC pulp to higher densities because of the stiffness of the NSSC fibers.

A shoe press may be used for dewatering a paper web. Many times the shoe press is used for dewatering the paper web without reducing the bulk too much. The design of a shoe press is such that the nip is longer than in other types of presses. Thereby the press pulse in the shoe press is longer. The longer press pulse means that sufficient dewatering may be obtained in a shoe press at a maximum nip pressure that is lower than in other types of presses. This reduction in maximum nip pressure has traditionally been used to save the bulk of the paper web.

The present inventor's solution to the above-identified problem of pressing a web from NSSC pulp to a high density is to use a shoe press at a very high line load. When a shoe press with such a high line load was used on a paper web from NSSC pulp, a high-density containerboard of high compressive strength was obtained.

Another benefit of the present invention is also that the increased compressive strength may be achieved at a maintained or even increased machine speed.

The present disclosure thus provides a method of producing a containerboard, comprising the step of pressing a web formed from a pulp comprising NSSC pulp in an extended nip press, such as a shoe press, wherein the line load in the extended nip press is above 1200 kN/m. The containerboard is intended for fluting in corrugated board.

Further, the present disclosure provides a corrugated board comprising a liner and a fluting, wherein the fluting is formed from a pulp comprising NSSC pulp, the density of the fluting is above 725 kg/m$^3$ and the geometric SCT index of the fluting is above 37 Nm/g.

BRIEF DESCRIPTION OF THE DRAWINGS

The invention is now described, by way of example, with reference to the accompanying drawings, in which:

FIGS. 3-11 relates to results obtained in pilot trials.

DETAILED DESCRIPTION

As a first aspect of the present disclosure, there is provided a method of producing a containerboard.

The containerboard is intended for use as fluting (i.e. corrugated medium) in corrugated board. Corrugated board comprises at least one layer of liner, which is non-corrugated, and at least one layer of fluting. In normal production of corrugated board, containerboard is corrugated and then glued to linerboard. For example, corrugated board may consist of a layer of fluting sandwiched between two layers of liner.

The method comprises a step of pressing a web formed from a pulp comprising NSSC pulp. The web is generally formed in a wire section, as conventional in the field.

In the head box (i.e. the camber from which the pulp is caused to flow onto the wire of the wire section), the pulp of the present disclosure may for example have a Schopper Riegler (°SR) (ISO 5267-1) value of 20-25 and a Water Retention Value (WRV) (ISO 23714:2007) of 1.7-2.1. After the NSSC pulping process, the SR value may for example be 13-19 and the WRV may for example be 1.3-1.7. This means that the pulp of the present disclosure may be subjected to refining, such as LC refining, between the NSSC pulping process and the head box.

For example, at least 50% (dry weight) of the pulp of the present disclosure may be NSSC pulp. In other examples, at least 55%, 60%, 65%, 70%, 75%, 80%, 85%, 90% or 95% (dry weight) of the pulp is NSSC pulp. The part of the pulp not being NSSC pulp may for example comprise recycled fibers. For example, the pulp of the present disclosure may consist essentially of NSSC pulp or a mixture of NSSC pulp and recycled fibers. "Recycled fibers" refers to fiber material that has previously been incorporated in some paper or board product. Alternatively or as a complement, the part of the pulp not being NSSC pulp may for example comprise reject pulp. For example, the pulp of the present disclosure may consist essentially of NSSC pulp and reject pulp. "Reject pulp" refers to pulp prepared by refining the screen reject from another process.

"NSSC pulp" is obtained from "NSSC pulping", which in turn is defined in the background section. The NSSC pulp of the present disclosure may for example be sodium-based NSSC pulp, which means that the cooking liquor of the NSSC cook comprised $Na_2SO_3$.

The pressing of the first aspect is carried out in an extended nip press, such as a shoe press. Shoe presses are marketed by several suppliers to the pulp and paper industry, such as Voith, Valmet and Andritz. An extended nip press is arranged in the press section of a papermaking machine. Downstream of the press section, the drying section is arranged.

Extended nip presses are different from conventional roll presses in that a longer nip is obtained.

In the method of the first aspect, the line load in the extended nip press is above 1200 kN/m. The "line load" refers to the applied force divided by the width of the nip. For example, the line load may be above 1300 kN/m, such as above 1400 kN/m, such as at least 1500 kN/m.

Shoe presses are usually not designed for such high line loads, but when the inventor specially requested that the line load should be as high as possible and at least 1500 kN/m, Voith offered a shoe press dimensioned for 1700 kN/m.

The press pulse in a nip of a press is obtained by dividing the line load by the machine speed. The total press pulse of a press section is obtained by summing the press pulses of the nips used in the press section.

The web of the first aspect may for example be subjected to a press impulse of at least 102 kPa*s, such as at least 110 kPa*s, such as at least 115 kPa*s, such as at least 120 kPa*s in the extended nip press. Such press pulses are obtainable in a shoe press with a high line load (see e.g. table 1, below).

The web of the first aspect may for example be subjected to a total press impulse of at least 122 kPa*s, such as at least 130 kPa*s, such as at least 135 kPa*s, such as at least 140 kPa*s in the press section. Such press pulses are obtainable in a press section comprising a shoe press used at a high line load (see e.g. table 1, below).

Figure 3:
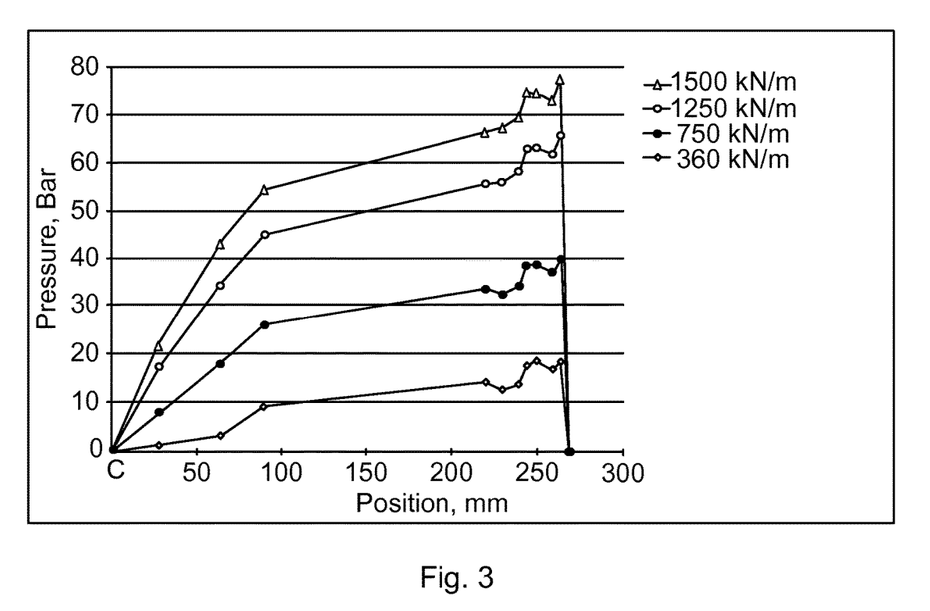
FIG. 3 shows nip pressure profiles in a shoe press at different line loads and a tilt of 1.3.
Figure 4:
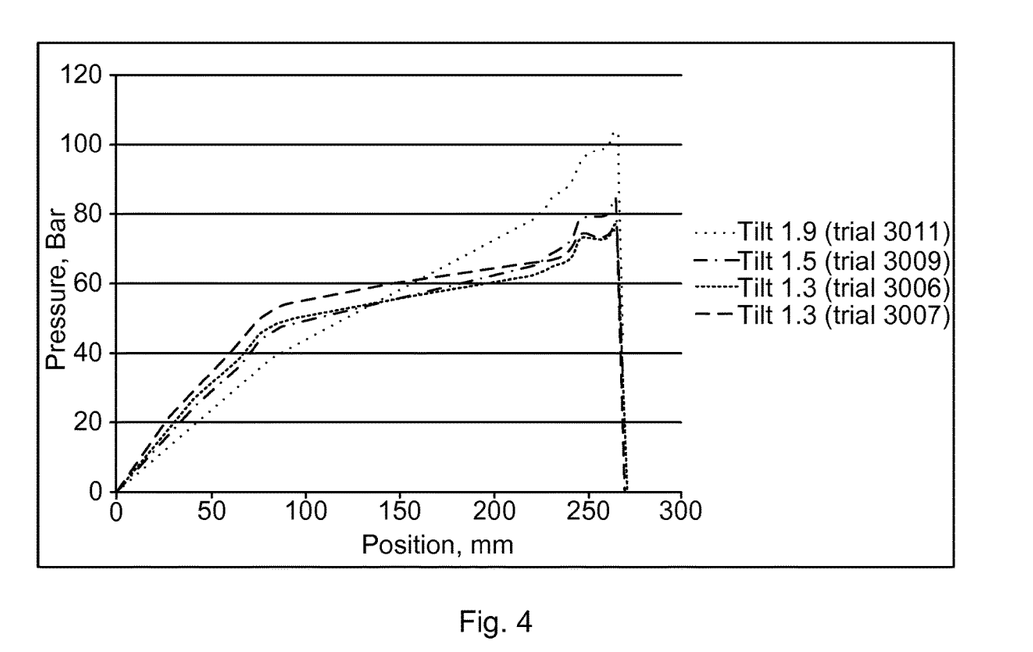
FIG. 4 shows nip pressure profiles in a shoe press at different tilts and a line load of 1400 kN/m. The nip pressure profile at a tilt of 1.3 and a line load of 1500 kN/m is also shown.

Further, the web of the first aspect may for example be subjected to peak nip pressure of at least 60 bar, such as at least 70 bar, such as at least 80 bar, such as at least 90 bar in the extended nip press, e.g. in the shoe press. As shown in FIGS. 3-4, such peak nip pressures are obtainable in a shoe press with a high line load. To further increase the peak pressure, the tilt of the shoe may be increased, as shown in FIG. 4. The "peak nip pressure" is sometimes referred to as the specific pressure.

A particular benefit of using a shoe press at a high line load is that a combination of a high peak nip pressure with a high press impulse is obtainable. Such a combination is particularly beneficial in the production of containerboard having high compressive strength from NSSC pulp.

The inventor has found that the compressive strength of the produced containerboard is substantially increased if the temperature of the web is increased before and/or in the extended nip press. For example, the web in the extended nip press may be at least 45° C., such as at least 50° C., such as at least 55° C., such as at least 60° C., such as at least 65° C. The temperature may for example be measured with an IR thermometer, such as a hand-held IR thermometer ("IR pistol"). To increase the temperature of the web, steam may be applied to it right before and/or in the shoe press. A steam box may for example be arranged right before the nip of the extended nip press, either below or above the web.

The nip length in the extended nip press may for example be at least 150 mm, such as at least 200 mm, such as at least 230 mm. In conventional roll presses, such nip lengths cannot be obtained.

In an embodiment of the first aspect, the web of the first aspect is further pressed in a second extended nip press, such as a second shoe press. The conditions in the second extended nip press may be as in the (first) extended nip press discussed above.

The press section employed in the first aspect may also comprise one or more roll presses (that are not shoe presses).

Alternatively, the press section may consist exclusively of one or more shoe presses. As conventional in the field, the press section of the first aspect is generally followed by a drying section.

Figure 5:
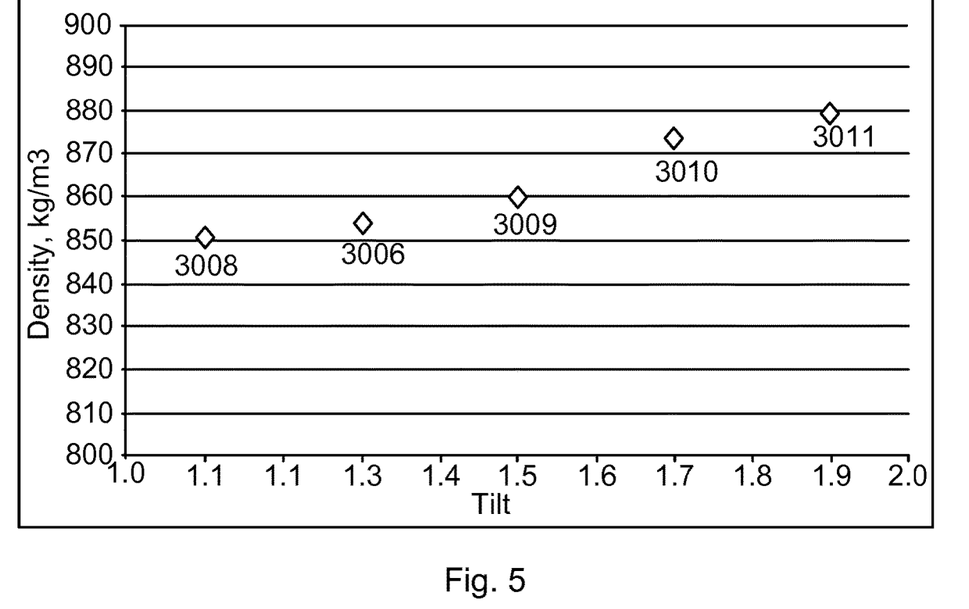
FIG. 5 shows the densities obtained when a shoe press was used at different tilts at a line load 1400 kN/m.
Figure 6:
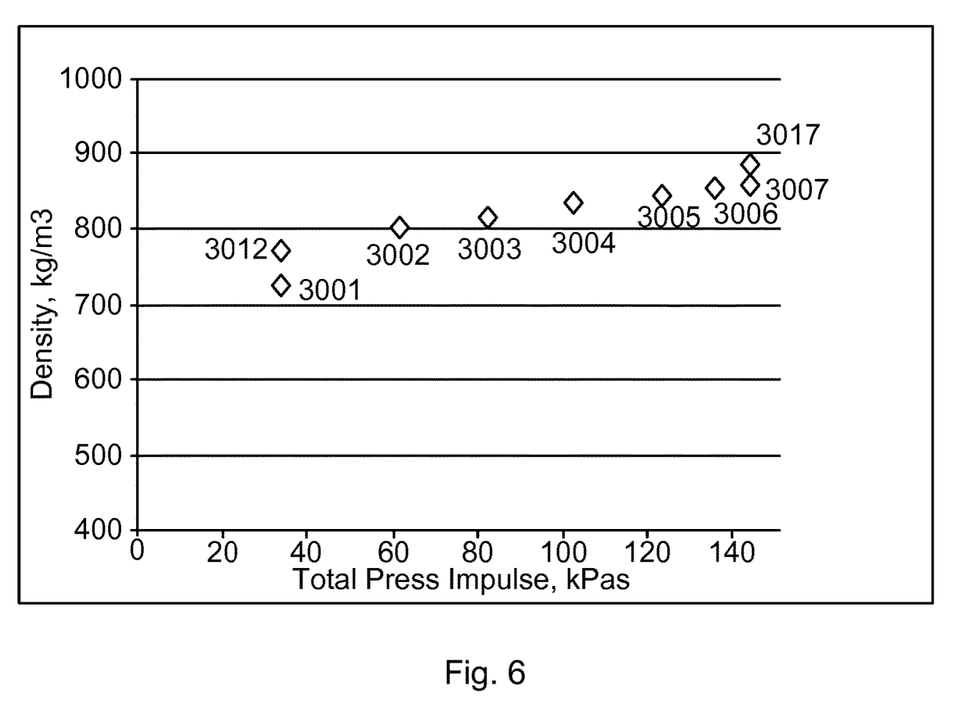
FIG. 6 shows the densities obtained when a shoe press was used at different line loads (306-1500 kN/m, resulting in different total press impulses) at a constant tilt (1.3). It also shows the density obtained at a line load of 1500 kN/m when steaming was added (point 3017).

As shown in FIGS. 5 and 6, the pressing according to the first aspect increases the density of the resulting containerboard and the increased densities results in increased compressive strength values. The density (SCAN-P 88:01) of the containerboard of the first aspect may for example be above 725 kg/m$^3$, such as at least 740 kg/m$^3$, such as at least 750 kg/m$^3$, such as at least 760 kg/m$^3$.

The compressive strength in the machine direction (MD) and the cross direction (CD) of the containerboard may be measured using a short-span compressive tester (SCT). The SCT compressive strength (N/m) may be measured according to ISO 9895. To calculate the compressive strength index, the compressive strength (N/m) is divided by the grammage (g/m$^2$). The unit of the SCT index is thus Nm/g. The grammage of the containerboard may for example be 100-200 g/m$^2$, such as 100-190 g/m$^2$, such as 110-180 g/m$^2$.

The geometric SCT index is calculated as the square root of the product of the SCT index in MD and CD:

geometric SCT index=√(SCT index(MD)*SCT index(CD)).

The geometric SCT index of the containerboard of the first aspect may for example be above 37 Nm/g, such as at least 38 Nm/g, such as at least 39 Nm/g, such as at least 40 Nm/g, such as at least 41 Nm/g, such as at least 42 Nm/g, such as at least 43 Nm/g, such as at least 44 Nm/g.

The compressive strength is considered to be more important in CD than in MD. The SCT index in CD of the containerboard of the first aspect may for example be above 28 Nm/g, such as at least 29 Nm/g.

As second aspect of the present disclosure, there is provided a corrugated board comprising a liner and a fluting. The fluting is formed from a pulp comprising NSSC pulp. Various examples of such a pulp are given above in connection with the first aspect.

The containerboard used to form the fluting of the second aspect may for example be obtained using the method of the first aspect.

The density (SCAN-P 88:01) of the fluting of the corrugated board of the second aspect is above 725 kg/m$^3$. Higher densities are generally associated with higher compressive strengths. According, the density of the fluting is preferably at least 740 kg/m$^3$, such as at least 750 kg/m$^3$, such as at least 760 kg/m$^3$.

The geometric SCT index (ISO 9895) of the fluting of the second aspect may for example be above 37 Nm/g. It is preferably at least 38 Nm/g, such as at least 39 Nm/g, such as at least 40 Nm/g, such as at least 41 Nm/g, such as at least 42 Nm/g, such as at least 43 Nm/g, such as at least 44 Nm/g.

As mentioned above, the compressive strength is considered to be more important in CD than in MD. The SCT index in CD of the fluting of the second aspect may for example be above 28 Nm/g, such as at least 29 Nm/g.

The CCT value may also be used to quantify the compressive strength. In the CCT measurement according to SCAN P-42, the sample is corrugated and the compressive strength is then measured in CD. To obtain the CCT index, the CCT value is divided by the grammage. The CCT index of the fluting of the second aspect may for example be at least 25 Nm/g, such as at least at least 26 Nm/g, such as at least 27 Nm/g. The containerboard of the first aspect may also have such a CCT index measured according to SCAN P-42.

The grammage (ISO 536) of the fluting may for example be 100-240 g/m$^2$, such as 100-200 g/m$^2$, such as 100-190 g/m$^2$, such as 110-180 g/m$^2$.

The Gurley air resistance (ISO 5636-5) of the fluting may for example be at least 150 s, such as at least 200 s.

There is also provide a three-dimensional article, such as a box or tray comprising walls composed of the corrugated board according to the second aspect. Such a box or tray may for example be suitable for fruit or vegetables.

EXAMPLES

Pilot trials were carried out at Packaging Greenhouse (Karlstad, Sweden). For the pilot trials, refined NSSC pulp was taken from the machine chest on paper machine 6 (PM6) in Gruvon paper mill (Grums, Sweden).

Figure 1:
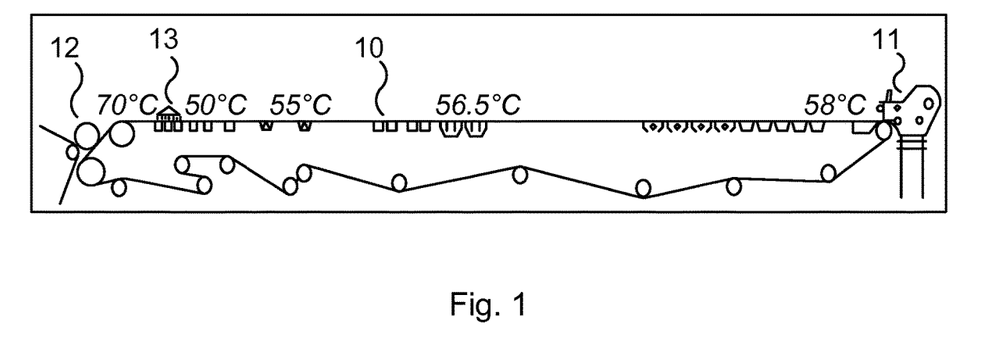
FIG. 1 is a schematic drawing of the wire section used in pilot trials.

FIG. 1 shows a schematic drawing of the wire section 10 used in the pilot trials. A head box 11 is arranged upstream the wire section 10. A press section 12 is arranged downstream the wire section 10. The temperature of various points in the wire section, as measured by an IR pistol, when a steam box 13 is employed is shown in the figure. The steam box 13 is arranged such that the temperature of the web can be increased from 50 to 70° C. shortly before the press section. However, the temperature falls below 70° C. in the press section, as explained below.

Figure 2:
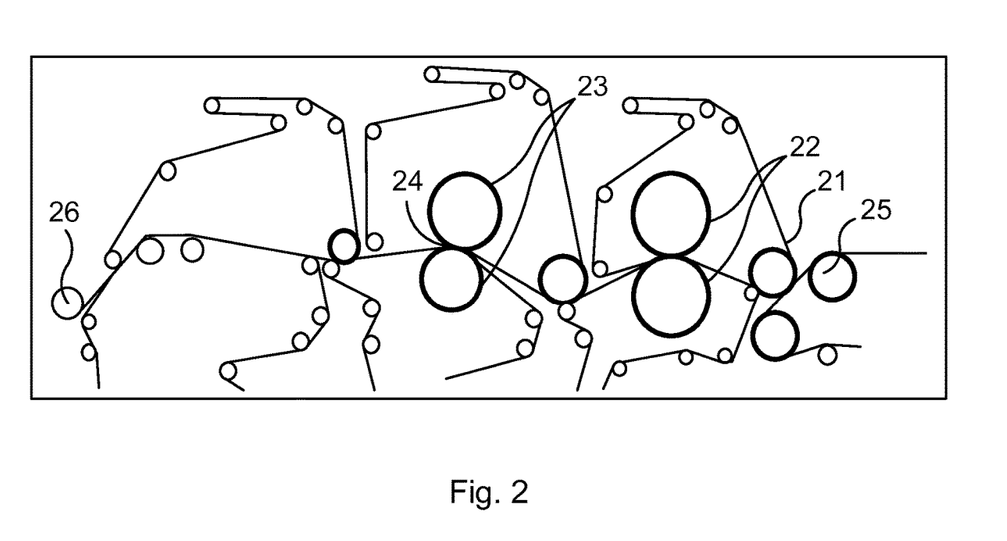
FIG. 2 is a schematic drawing of the press section used in pilot trials.

FIG. 2 shows a schematic drawing of the press section used in the pilot trials. After the pick-up roll 21, a double-felted jumbo press (first press) 22 is arranged followed by a double-felted shoe press (second press) 23. After the second press nip 24, the web is transported through a third press (not shown). In trial 3012 (see below), which did not involve steaming, the temperature measured with an IR pistol was approximately 47° C. before an after the couch 25, 44° C. after the first press 22, 40° C. after the second press 23 and 38° C. on the reel 26. In trial 3017 (see below), which involved steaming, the temperature was instead approximately 52° C. before an after the couch 25, 53° C. after the first press 22, 49° C. after the second press 23 and 47° C. on the reel 26.

Tables 1 and 2 below show the different pilot trials. The machine speed (wire) was 730 m/min (which is higher than the machine speed on PM6) and the target grammage was 140 g/m$^2$. The vertical slice lip was 16.1 mm. The samples from the pilot trials of tables 1 and 2 were dried off-line in a one-cylinder dryer.

A first reference trial (3001) was carried out before trials with higher line loads and a second reference trial (3012) was carried out after the trials with higher line loads. In the reference trials, the same press impulse as obtained on PM 6 today was used to simulate the process conditions on PM6.

TABLE 1

Trials with varying line loads. The tilt was 1.3 in all trials. The steam box was turned off in all trials except trial 3017.

| | First press | | Second/shoe press | | Total | |
|---|---|---|---|---|---|---|
| Trial # | Line load, (kN/m) | Press impulse (kPa * s) | Line load, (kN/m) | Press impulse (kPa * s) | press impulse (kPa * s) | Resulting density (kg/m$^3$) |
| 3001 (ref) | 106 | 8.7 | 306 | 25.2 | 33.9 | 726 |
| 3002 | 250 | 20.5 | 500 | 41.1 | 61.6 | 802 |
| 3003 | 250 | 20.5 | 750 | 61.6 | 82.2 | 815 |
| 3004 | 250 | 20.5 | 1000 | 82.2 | 102.7 | 834 |

TABLE 1-continued

Trials with varying line loads. The tilt was 1.3 in all trials. The steam box was turned off in all trials except trial 3017.

| Trial # | First press | | Second/ shoe press | | Total | |
|---|---|---|---|---|---|---|
| | Line load, (kN/m) | Press impulse (kPa * s) | Line load, (kN/m) | Press impulse (kPa * s) | press impulse (kPa * s) | Resulting density (kg/m³) |
| 3005 | 250 | 20.5 | 1250 | 102.7 | 123.3 | 841 |
| 3006 | 250 | 20.5 | 1400 | 115.1 | 135.6 | 854 |
| 3007 | 250 | 20.5 | 1500 | 123.3 | 143.8 | 859 |
| 3017 | 250 | 20.5 | 1500 | 123.3 | 143.8 | 886 |
| 3012 (ref) | 106 | 8.7 | 306 | 25.2 | 33.9 | 771 |

Table 1 shows that the density was increased by 9% compared to the most reliable reference point (3012) by increasing the line load in the shoe press to 1250 kN/m. When the line load in the shoe press was increased to 1500 kN/m, the density was increased by ii % compared to the most reliable reference point. When the line load was 1500 kN/m and steam was added, the density was increased by 15% compared to the most reliable reference point.

In commercial production using a full-scale drying section (such as the production on PM6), the obtained densities are generally lower than in the pilot trials, wherein a one-cylinder off-line dryer was used. It is however expected that the relative increase in density will be about the same in the commercial production as in the pilot trials when a shoe press is used at a high line load. The density of the containerboard produced on PM6 has been about 670 kg/m³. It is thus expected that the commercial containerboard will have a density of at least 725 kg/m³ when a shoe press is used at a line load of at least 1200 kN/m.

TABLE 2

Trials with varying tilt on shoe press

| Trial # | Line load, first press (kN/m) | Line load, second/shoe press (kN/m) | Tilt | Steam box |
|---|---|---|---|---|
| 3008 | 250 | 1400 | 1.1 | Off |
| 3006 | 250 | 1400 | 1.3 | Off |
| 3009 | 250 | 1400 | 1.5 | Off |
| 3010 | 250 | 1400 | 1.7 | Off |
| 3011 | 250 | 1400 | 1.9 | Off |

FIG. 3 shows nip pressure profiles for the second press (the shoe press) at different line loads and a tilt of 1.3, which is a default value. In the reference trial (3001), the maximum nip pressure was below 20 bar. When a line load of 750 kN/m (trial 3003) was used, the maximum nip pressure was about 40 bar. When a line load of 1250 kN/m and 1500 kN/m was used, the maximum nip pressure was about 65 and 75 bar, respectively.

FIG. 4 shows that the maximum nip pressure can be increased by increasing the tilt. At a line load of 1400 kN/m, the maximum nip pressure was above 100 bar for a tilt of 1.9.

FIG. 5 shows that the density increases with an increasing tilt.

FIG. 6 shows that the density increases with an increasing press impulse (kPa*s). In turn, the press impulse increased with an increasing line load. The second reference trial (3012) resulted in a higher density than the first reference trial (3001). The reason for this difference may be attributed to startup imbalances, such as insufficient fines balance and/or other effects related to, for example, temperatures, performance of press felts etc. The second reference trial (3012) is therefore considered to give a more representative value.

FIG. 6 further shows that steaming (trial 3017) gives an extra increase in density.

Figure 7:
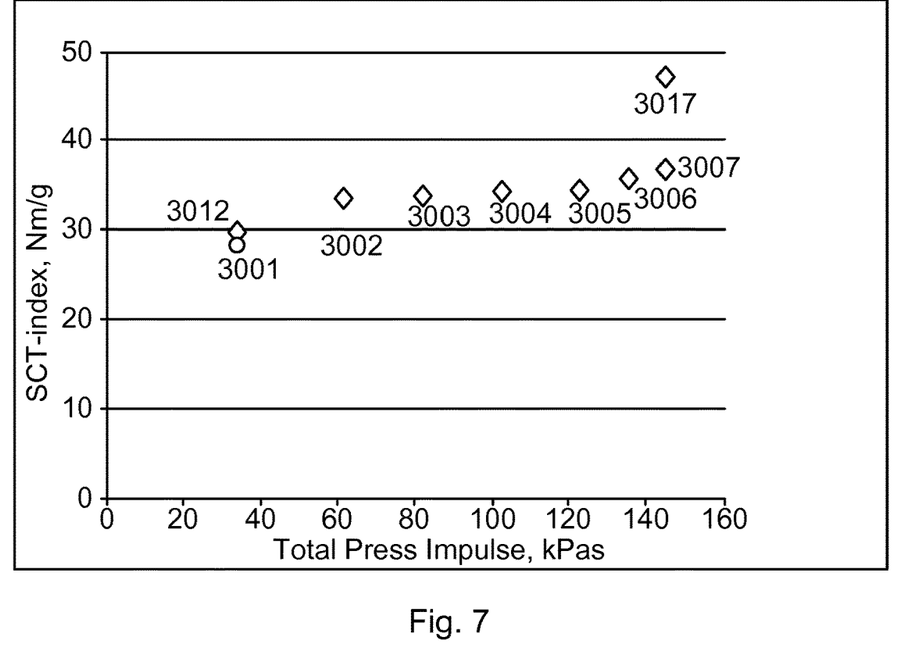
FIG. 7 shows the geometric SCT index values obtained when a shoe press was used at different line loads (306-1500 kN/m, resulting in different total press impulses) at a constant tilt (1.3). It also shows the geometric SCT index obtained at a line load of 1500 kN/m when steaming was added (point 3017).

Compressive strength is considered to be the most important property for a corrugated medium. FIG. 7 shows the geometric SCT index obtained at the different press impulses. In general, the geometric SCT index increases with an increasing press pulse. The press pulses generated by the line loads 1400 and 1500 kN/m, i.e. trials 3006, 3007 and 3017, appear to have a particular influence on the compressive strength. FIG. 7 further shows that steaming (trial 3017) gives a significant extra increase of the geometric SCT index value.

Figure 8:
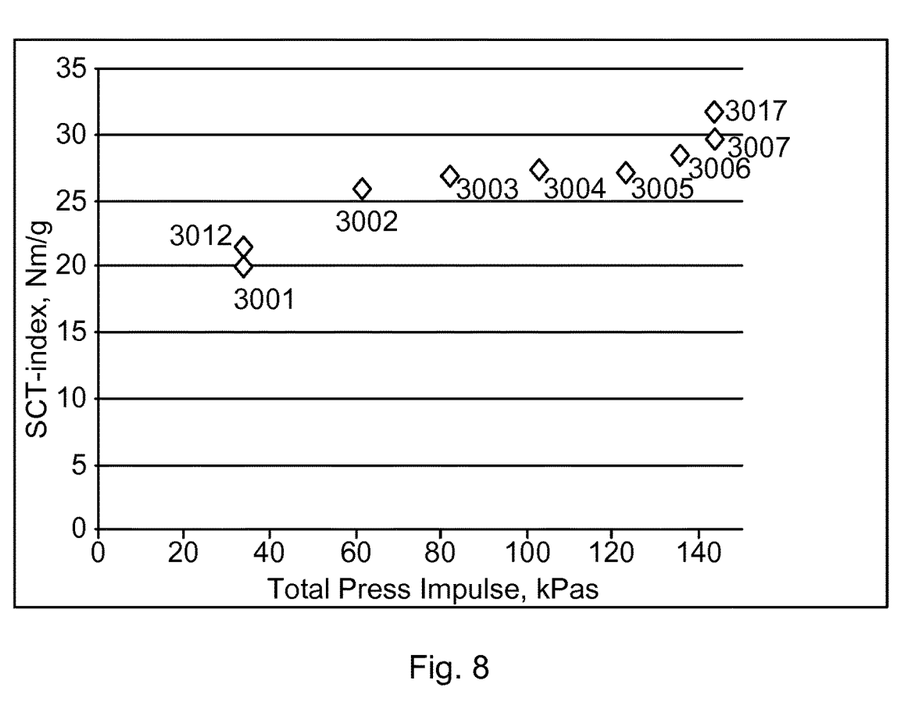
FIG. 8 shows the SCT index values in the cross direction (CD) obtained when a shoe press was used at different line loads (306-1500 kN/m, resulting in different total press impulses) at a constant tilt (1.3). It also shows the geometric SCT index obtained at a line load of 1500 kN/m when steaming was added (point 3017).

The compressive strength in the CD is particularly important. FIG. 8 shows that the SCT index in CD increases with an increasing press pulse.

Figure 9:
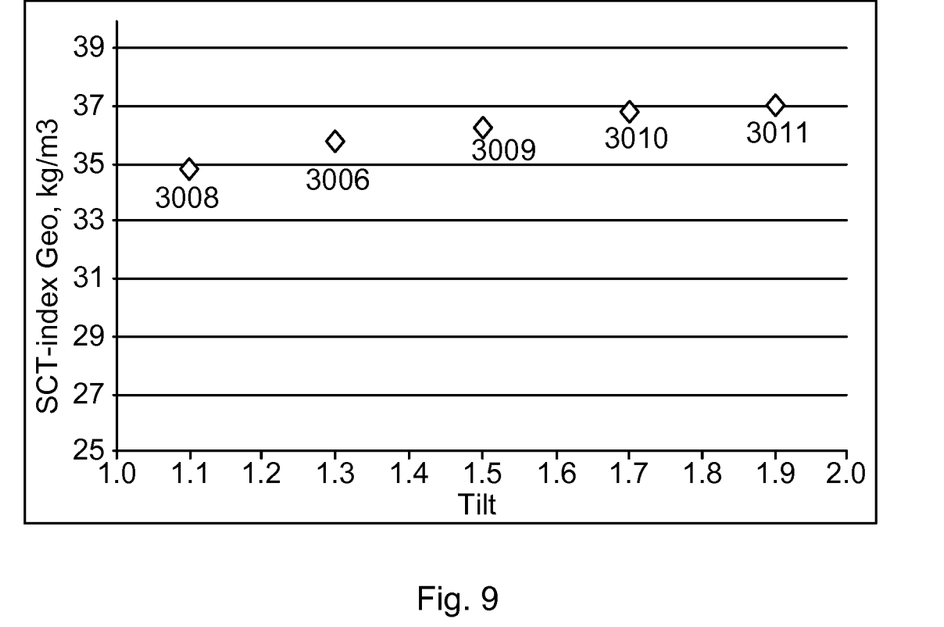
FIG. 9 shows the geometric SCT index values obtained when a shoe press was used at different tilts at a line load 1400 kN/m.

FIG. 9 shows that not only the density, but also the geometric SCT index, increases with an increasing tilt. The geometric SCT index was thus increased when the maximum nip pressure increased.

Figure 10:
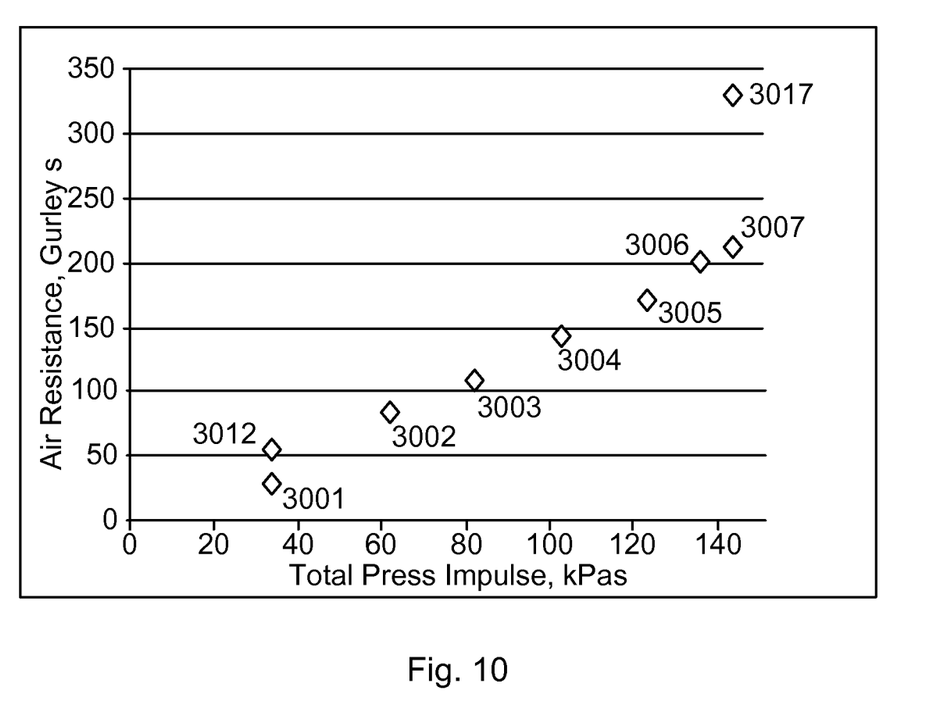
FIG. 10 shows the air resistance measured according to the Gurley method (ISO 5635-5) of the paper obtained when a shoe press was used at different line loads (306-1500 kN/m, resulting in different total press impulses) at a constant tilt (1.3). It also shows the Gurley air resistance obtained at a line load of 1500 kN/m when steaming was added (point 3017).

The densification of the containerboard may also be quantified by measuring the air resistance according to the Gurley test. FIG. 10 shows a significant increase in the air resistance when the press impulse was increased.

Figure 11:
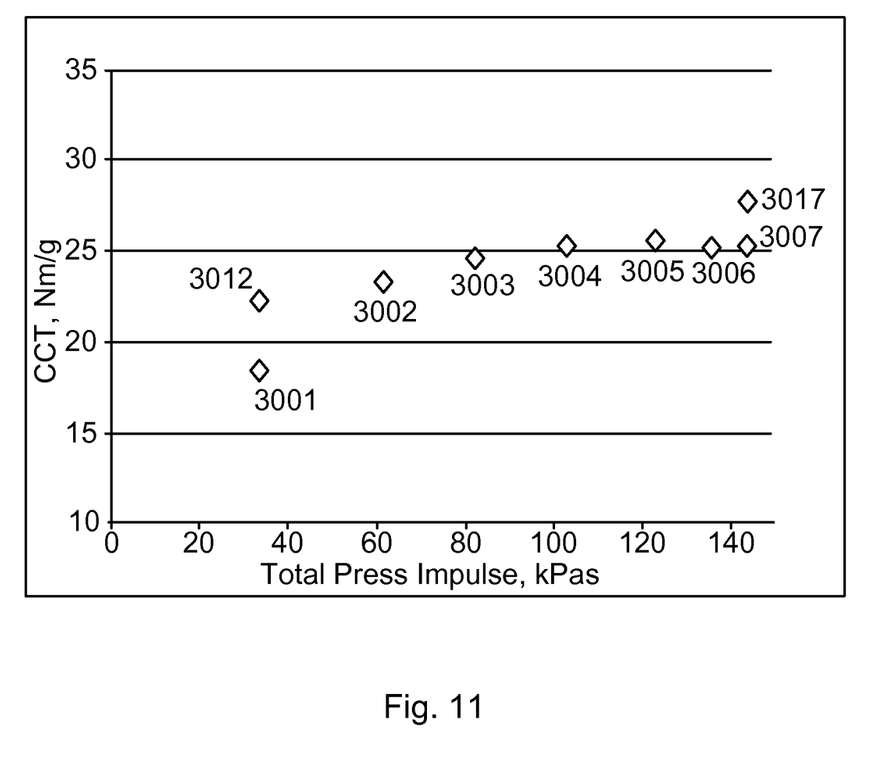
FIG. 11 shows the CCT index values obtained when a shoe press was used at different line loads (306-1500 kN/m, resulting in different total press impulses) at a constant tilt (1.3). It also shows the CCT index obtained at a line load of 1500 kN/m when steaming was added (point 3017). The CCT index is measured in CD.

FIG. 11 shows the CCT index at the different press impulses. The press pulses generated at a line load of at least 1000 kN/m, i.e. trials 3004, 3005, 3006, 3007 and 3017, resulted in CCT index values above 25 Nm/g. Line loads below 1000 kN/m resulted in CCT index values below 25 Nm/g. FIG. 11 further shows that steaming (trial 3017) gives a significant extra increase of the CCT index value.

The invention claimed is:

1. Corrugated board comprising:
    a liner; and
    a fluting, wherein the fluting is formed from a pulp comprising NSSC pulp, the density according to ISO 534 of the fluting is above 725 kg/m³, the geometric SCT index according to ISO 9895 of the fluting is above 37 Nm/g, the SCT index in CD of the fluting is above 28 Nm/g, and the CCT index according to SCAN P-42 of the fluting is at least 25 Nm/g.

2. The corrugated board of claim 1, wherein the density according to ISO 534 of the fluting is at least 740 kg/m³.

3. The corrugated board of claim 1, wherein the geometric SCT index of the fluting is at least 38 Nm/g.

4. A box or tray for fruit or vegetables comprising walls composed of the corrugated board according to claim 1.

5. The corrugated board of claim 2, wherein the density according to ISO 534 of the fluting is at least 760 kg/m³.

6. The corrugated board of claim 1, wherein the geometric SCT index of the fluting is at least 41 Nm/g.

7. The corrugated board of claim 1, wherein the CCT index according to SCAN P-42 of the fluting is at least 27 Nm/g.

8. The corrugated board of claim 1, wherein the grammage of the fluting is 100-200 g/m2.

* * * * *